United States Patent [19]
Mao et al.

[11] Patent Number: 6,113,282
[45] Date of Patent: Sep. 5, 2000

[54] CYLINDRICAL OPTICS ASSEMBLY AND METHOD MAKING THE SAME

[75] Inventors: Zhong Ming Mao, Santa Clara; Peter C. Chang, Mountain View; Paisheng Shen, Fremont, all of Calif.

[73] Assignee: Alliance Fiber Optics Products, Inc., Sunnyvale, Calif.

[21] Appl. No.: 08/968,328

[22] Filed: Nov. 12, 1997

[51] Int. Cl.[7] .................................................. G02B 6/36
[52] U.S. Cl. ............................................................ 385/79
[58] Field of Search ........................................ 385/70–80

[56] References Cited

U.S. PATENT DOCUMENTS

| | | | |
|---|---|---|---|
| 4,822,129 | 4/1989 | Webb | 385/79 |
| 5,177,808 | 1/1993 | Satake et al. | 385/98 |
| 5,586,207 | 12/1996 | Goodwin | 385/92 |

Primary Examiner—Akm E. Ullah

[57] ABSTRACT

An optics assembly (10) includes an associated optical fiber (12). A ferrule (14) is formed with an output end (16) of the fiber (12) as a reinforcement interface device for connectively confronting a lens (18). Both the ferrule (14) and the lens (18) are inserted into an resilient split holder (20) from two opposite open ends thereof for self-adjustment and self-alignment between both the ferrule (14) and the lens (18), thus assuring both of them are axially aligned with each other. An enclosure (24) encloses the split holder (20) and the associated ferrule (14) and lens (18), optionally.

6 Claims, 6 Drawing Sheets

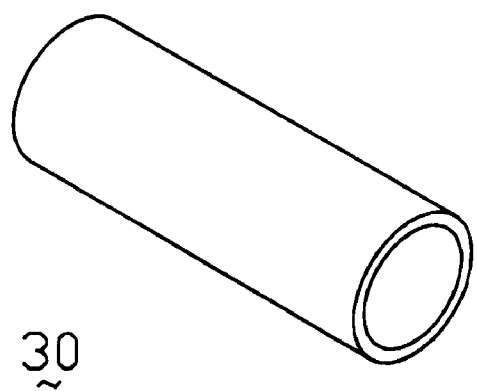
FIG. 5
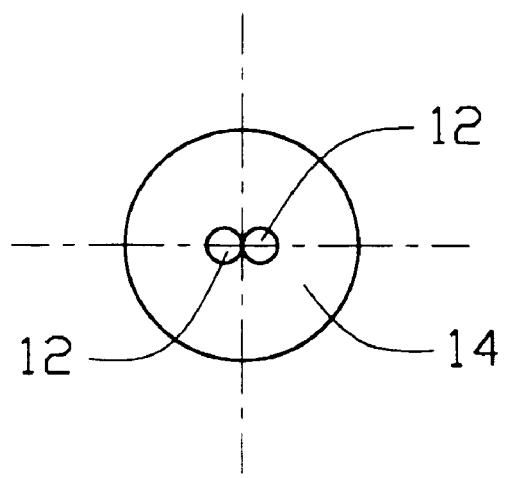 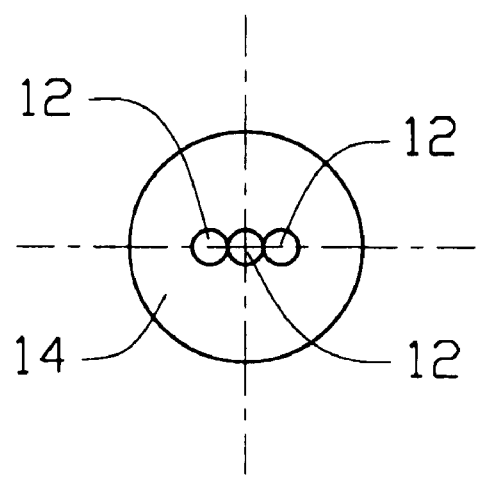
FIG. 6  FIG. 7

6,113,282

CYLINDRICAL OPTICS ASSEMBLY AND METHOD MAKING THE SAME

BACKGROUND OF THE INVENTION

1. Field of The Invention

The invention relates to a cylindrical optics assembly and a method making the same, and particularly to a new arrangement of such cylindrical assembly which may significantly simplify assembling thereof.

2. The Related Art

A cylindrical optics assembly with a GRIN lens, such as a collimator, can be use with at least an optical fiber for collimating the dispersive light occurring around an output end of such fiber. The collimated light may be efficiently and controllably utilized for the transmission or testing purpose. Understandably, the lens can transform the output of the light according to a Sine/Cosine format by changing the thickness of the lens to meet the desired one such as a spot light instead of the aforementioned collimated light.

As shown in FIGS. 1 and 2, the structure of a traditional cylindrical optics assembly 100 uses a lens 102, e.g., a GRIN lens, closely faces to an output end of an optical fiber 104. Because the optical fiber 104 is so tiny and feeble, a capillary 106 designedly attachably surrounds the output end of the fiber 104, and then the capillary 106 with the associated fiber 104 is very very carefully and gently positioned with regard to the GRIN lens 102 commonly within a tubular fastening holder 108. There are two reasons to provide a capillary 106 surrounding the end of the fiber 104. The first reason is to reinforce the end of the fiber 104 for easy controllably positioning the fiber 104 end with regard to the corresponding lens 102. The second reason is to function as an adaptor to largely increase the diameter around the end assembly portion of the fiber 104 and have such end assembly portion of the fiber 104 and the lens 102 in a compliance manner, i.e., the outer diameter or circumferential configuration of these two parts complying with each other. It should be noted that the fiber 104 has a 150 μm diameter and the lens 102 generally has a 1800 μm diameter, and there is a relatively large difference therebetween. This is the reason why the capillary 106 should be attached to the end of the fiber 104 for functioning as an adaptor, thus resulting in the end assembly portion of the fiber 104 through the associated capillary 106 commonly defining a dimension generally very close to the diameter of the lens 102. Therefore, it is relatively easy to controllably adjust the relative positions between the lens 102 and the end of the fiber 104 within the holder 108. Under some certain situations, due to the limitations of the specification of the existing lens 102 and fiber 104, both the fiber 104 and the lens 102 should use their respective adaptors on their exterior for achievement of circumferential compliance therebetween.

After the mutually/relatively positions of both capillary 106 and GRIN lens 102 have been attained, both of them are respectively glued by adhesive 110 to the inner surface of the fastening holder 108, thus finalizing an optics assembly which has a connected fiber and emits the desired either the collimated or the focused spot light. It can be understood that the tubular fastening holder 108 provides an inner diameter relatively larger than outer diameters of both the capillary 106 and the GRIN lens 102 for forming a sufficiently large clearance C therebetween whereby both of the capillary 106 and the GRIN lens 102 can adjustably move with regard to each other in the fastening holder 108 in all directions until they relatively reach the corresponding mutually aligned positions and glued with regard to the outer holder 108 at their final positions.

It should be appreciated that to adjust the mutually aligned positions of both of the capillary 106 and the GRIN lens 102 is a very difficult matter because it involves five parameters, i.e., X, Y and Z coordinate axes of a rectangular coordinate system and α and β angles of a polar coordinate system. It is very common to take several hours to get the truly aligned relative positions of both the capillary 106 and the GRIN lens 102 in the holder 108. Also, even after true positions of both parts are obtained, the gluing procedure for fastening both parts to the outer holder 102 should be taken very carefully and time-consuming for not influencing the difficultly obtained true positions of both parts in the holder 108.

Therefore, it is an object of the invention to provide a simplified structure of the cylindrical optics assembly which allows easy assembling for alignment between the GRIN lens and the corresponding fiber, while still maintaining the requirement of precision of such alignment therebetween.

SUMMARY OF THE INVENTION

According to an aspect of the invention, a cylindrical optics assembly includes an associated optical fiber. A ferrule or a traditional capillary is attachably formed with an output end of the fiber as a reinforcement/adaptor interface device for connectively confronting a GRIN lens. Both the ferrule and the GRIN lens are inserted into an elastic/expansible split holder from two opposite open ends thereof for self-adjustment and self-alignment of and between both the ferrule and the GRIN lens, thus assuring both of them are axially aligned with each other. The ferrule and the lens may be respectively fastened to the split holder after the predetermined relative axial positions have been reached. Moreover, an enclosure may optionally encloses the split holder and the associated ferrule/lens for functioning as a package.

BRIEF DESCRIPTION OF THE DRAWINGS

FIG. 5 is a perspective view of an optionally used auxiliary adaptor tube of the cylindrical optics assembly of FIG. 3, for one of the ferrule and the lens having the smaller diameter than the other.

FIG. 6 is a cross-sectional view of the ferrule with two fibers therein of the second embodiment of the invention.

FIG. 7 is a cross-sectional view of the ferrule with three fibers therein of the third embodiment of the invention.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
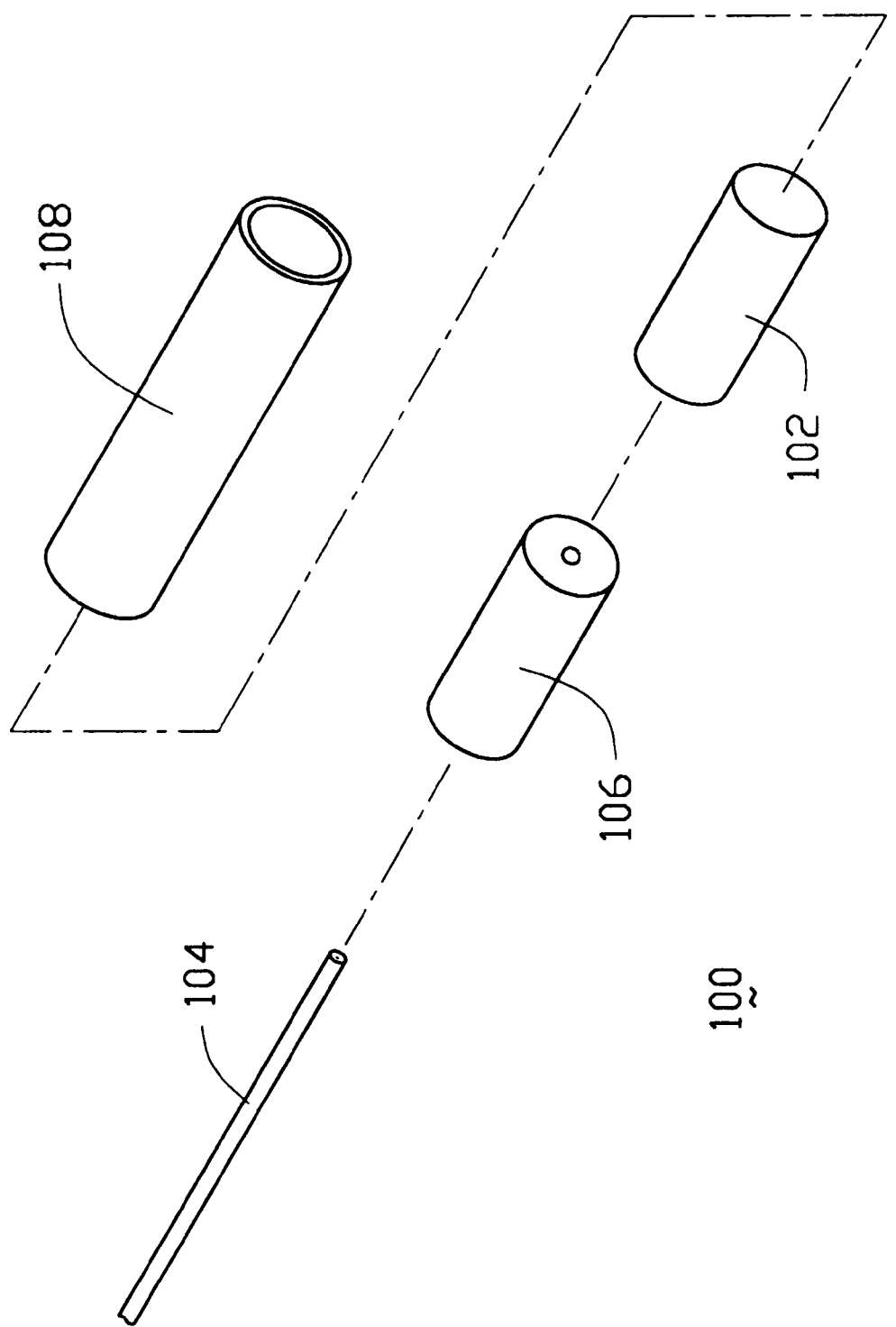
FIG. 1 is an exploded perspective view of a traditional cylindrical optics assembly.
Figure 2:
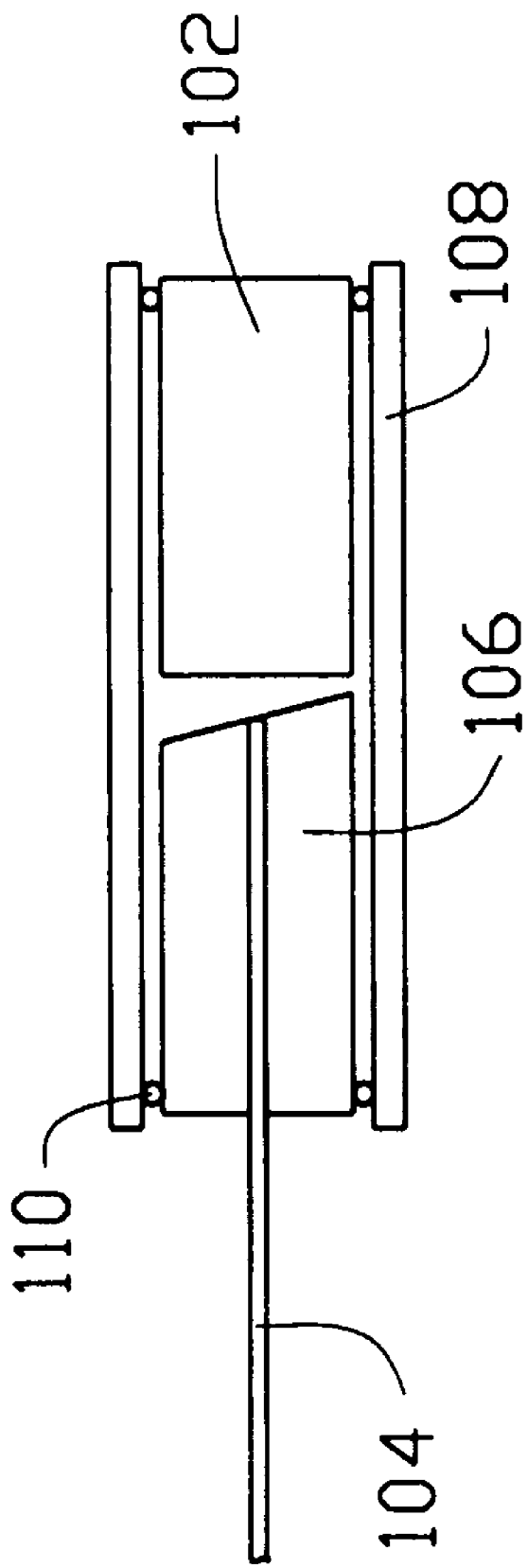
FIG. 2 is a cross-sectional view of the cylindrical optics assembly of FIG. 1.
Figure 3:
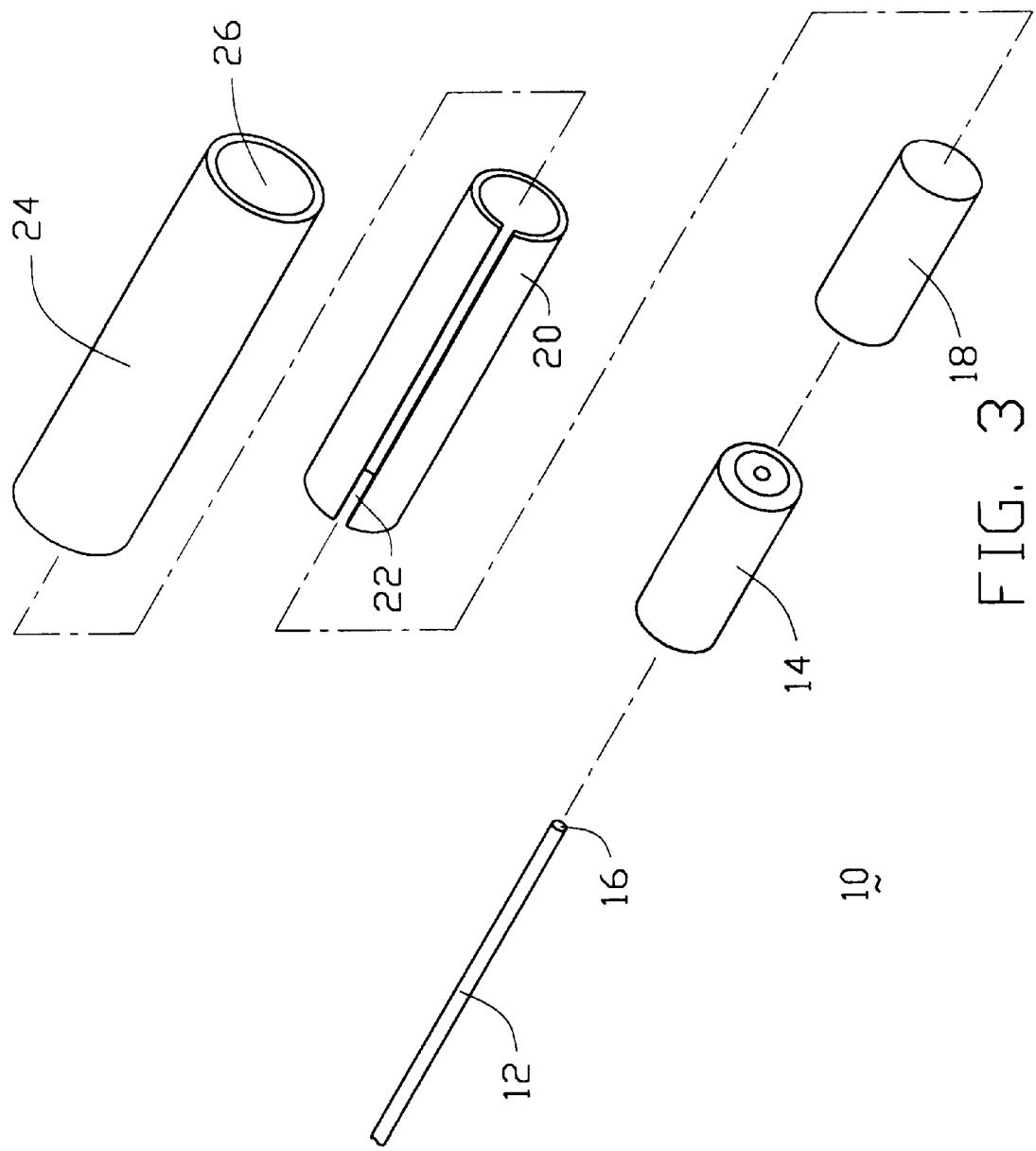
FIG. 3 is an exploded perspective view of a presently preferred embodiment of a cylindrical optics assembly, according to the invention.
Figure 4:
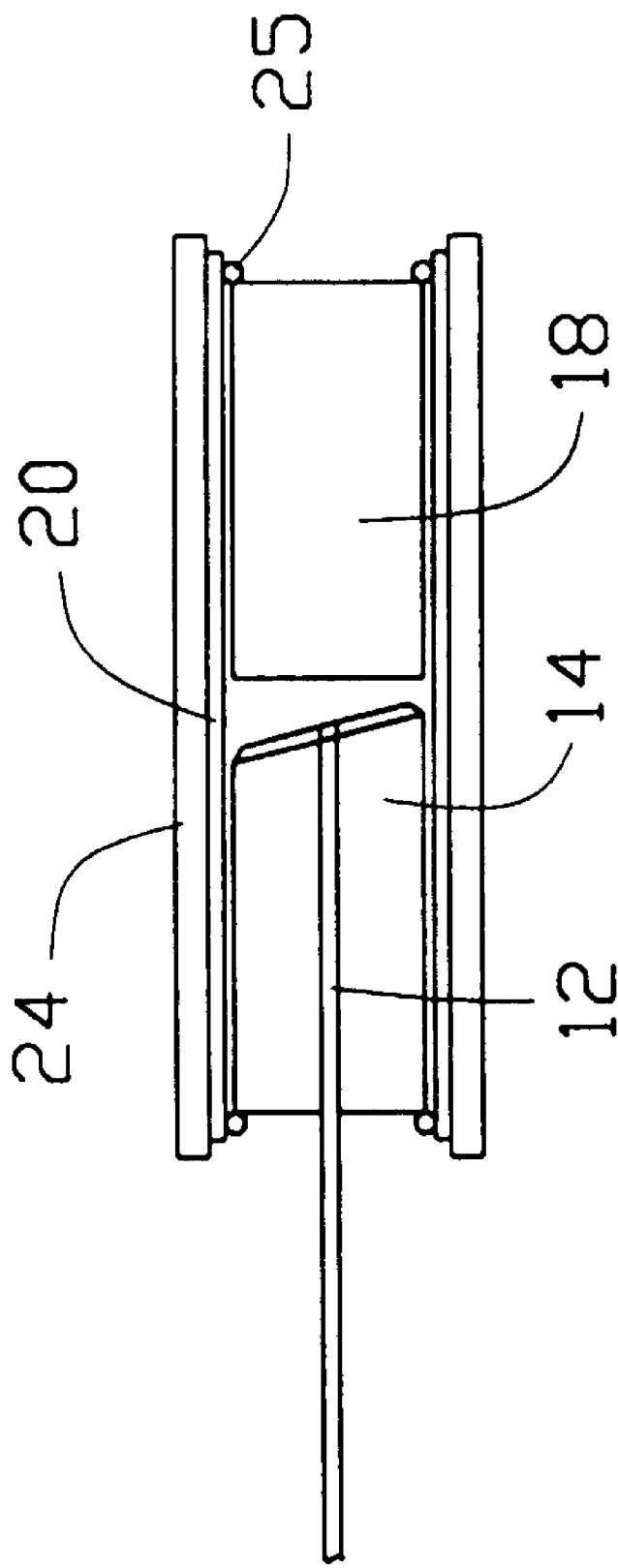
FIG. 4 is a cross-sectional view of the cylindrical optics assembly of FIG. 3 to show the coaxial relationship among the parts.

It will be noted here that for a better understanding, most of like components are designated by like reference numerals throughout the various figures in the embodiments. Attention is directed to FIGS. 3 and 4 wherein a cylindrical optics assembly 10 includes an optical fiber 12 and a ferrule 14 retainably attached to the front output end 16 of the fiber 12. A GRIN lens 18 face to face confronts the ferrule 14 wherein the diameter of the lens 18 is substantially same as that of the ferrule 14. An expandable split holder or tube 20 generally is adapted to enclose the ferrule 14 and the lens 18 wherein said split holder 20 is provided with a cut-out slit 22 so that the split holder 20 is capable of expanding radially. In this practice, the inner diameter is somewhat smaller than that of the ferrule 14 or of the lens 18, so that after the ferrule 14 and the lens 18 are commonly inserted into the split holder 20 from two opposite open ends, the split holder 20 may expandably and properly hold both of them therein and naturally the ferrule 14 and the lens 18 can be self-adjustably aligned with each other in an axial direction automatically due to inward forces exerted by radial shrinkage of the split holder 20. After the predetermined relative axial positions of the both ferrule 14 with the associated end 16 of the fiber 12 and the lens 18 have been reached, both of the ferrule 14 and the lens 18 can be bounded or fastened to the holder 20 by means such as adhesive 25. Lastly, a protective enclosure or barrel 24 can optionally attachably encloses the whole split holder 20.

It can be contemplated that the relative positions between the fiber output end and the corresponding lens is a key issue for the performance of the assembly. The conventional method lacks the split holder of the invention and uses complicated equipments to simultaneously align the complementary parts, i.e., the capillary and the lens in all directions, thus requiring high skilled technique and taking tremendous time for full implementation. Differently, in the invention, via the split holder 20, the output end 16 of the fiber 12 and the lens 18 can be easily aligned with each other for their center points along the axial direction, and only the distance therebetween along such axial direction is required to be controllably arranged for compliance with the focal point and/or focus depth of the lens 18. Therefore, the whole assembly 10 can be obtained in a simple, economic and time-saving procedure.

It is appreciated that to facilitate insertable engagement between the ferrule 14 and the split holder 20, the front end of the ferrule 14 forms tapered or chamfered configuration thereabouts. In the present invention, only one optical fiber 12 is shown to be used within the assembly, while it should be understood that more than one fibers can be used with the assembly. For example, two fibers 12 may be embedded in the ferrule 14 under the condition that they are symmetrical to each other with regard to a center line L of the ferrule 14, as shown in FIG. 6; three fibers 12 may also be embedded in the ferrule 14 under the same condition, as shown in FIG. 7. Alternately, three fibers 12 may be also arranged in an equiangular triangle type within the ferrule 14.

It is also noted, when the ferrule 14 and the lens 18 have a somewhat diameter differences therebetween, an auxiliary adaptor tube 30 (FIG. 5) is required to be applied to the one having the smaller diameter for compensation and compliance with the other party.

It is contemplated that the prior art uses a holder 108 having an inner diameter A larger than an outer diameter B of the capillary 106 or an outer diameter C of the lens 102 thereby allowing the lens 102 and the capillary 106 to loosely and adjustably be relatively move within the holder 10 for alignment. Differently, in the present invention, the holder 20 has an inner diameter A' originally smaller than an outer diameter B' of the ferrule 14 and an outer diameter C' of the lens 18, thereby forcibly aligning the ferrule 14 and the lens 18 in an axial direction. Correspondingly, because the lens 18 and the ferrule 14 move toward each other from two opposite ends of the holder 20 and the holder 20 has the smaller diameter than the lens 18 and the ferrule 14, the slit 22 provides a space allowing the air to be released therefrom during the procedure that the ferrule 14 and the lens 18 move toward each other from two opposite ends of the holder 20 and successively gradually closer to each other until they almost confront in the middle portion of the holder 20. Understandably, in the prior art holder 108, the air release in the holder 108 due to insertion of the lens 102 and the capillary 106 from two opposite ends thereof does not bring a consideration because the holder 108 has a larger inner diameter A than the outer diameter B of the capillary 106 or the outer diameter C of the lens 102, thus allowing the air to be released from two opposite ends.

Figure 8A:
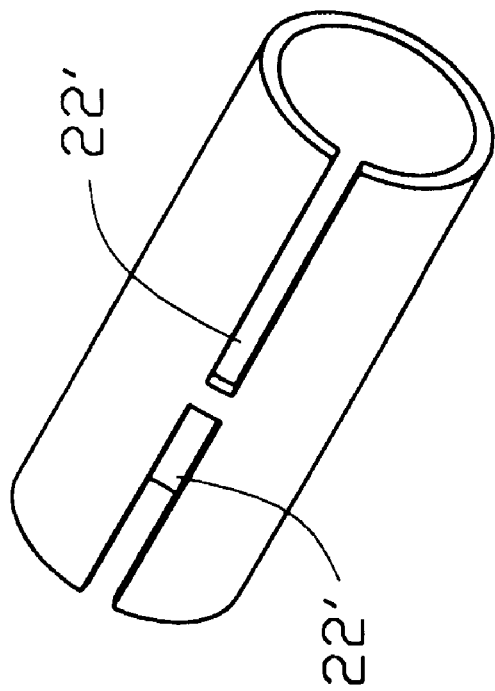
FIG. 8(A) and 8(B) are perspective views of holders of two other embodiments.
Figure 8B:
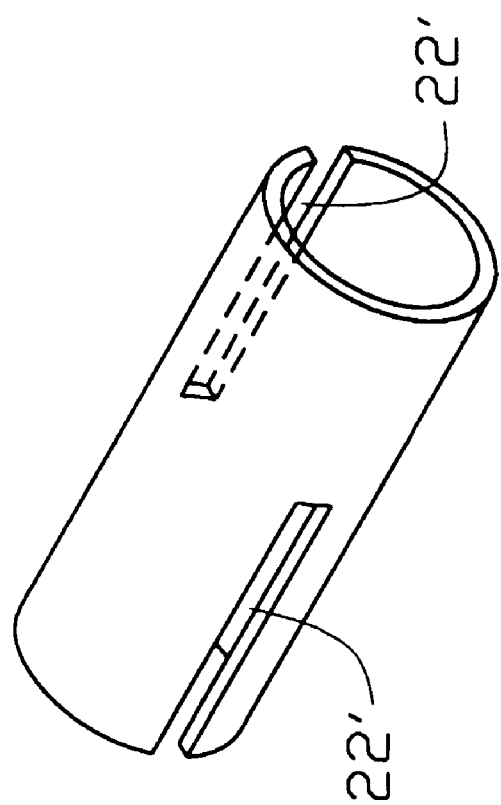

It can be understood that in the embodiment while the slit 22 extends through the whole length of the holder 20, a pair of disconnected slits 22' as shown in FIGS. 8(A) and 8(B) may be used therewith instead of the complete in-line slit 22.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

What is claimed is:

1. A method for making a optics assembly, the steps comprising:

providing a ferrule formed with a front output end of an optical fiber;

providing a lens face to face confronting a front end of said ferrule;

providing a radially expandable holder enclosing both the ferrule and said lens for radial adjustment of both the ferrule and lens within the split holder and self-alignment of said ferrule and said lens in an axial direction;

adjusting relative positions of both said ferrule and lens along said axial direction thereof; and maintaining the relative positions of both said ferrule and lens in the split holder.

2. The method as defined in claim 1, wherein an additional step is provided to have a protective enclosure enclose the split holder.

3. The method as defined in claim 1, wherein a front end of said ferrule is tapered or chamfered for facilitating insertion of the ferrule into the holder.

4. The method as defined in claim 1, wherein said holder is provided with at least a slit along an axial direction.

5. An optics assembly comprising:

a ferrule formed with a front end of an optical fiber;

a lens with substantially the same diameter as that of the ferrule face to face confronting the ferrule in a non-finalized distance therebetween;

an expandable holder with a smaller diameter than those of the ferrule and the lens, expansively enclosing both the ferrule and the lens therein; whereby said ferrule and said lens can be aligned with each other along an axial direction by means that exerted forces due to shrinkage of the holder adjust the relative radial positions of both the ferrule and the lens in said holder.

6. The semi-finished optics assembly as defined in claim 5, wherein said holder includes means for providing expansion or radial resiliency thereof.

* * * * *